United States Patent [19]

Phillips

[11] 3,928,574

[45] Dec. 23, 1975

[54] METHOD AND COMPOSITION FOR TREATING DIARRHEA IN MAMMALS

[75] Inventor: Robert W. Phillips, Fort Colllns, Colo.

[73] Assignee: Colorado State University Research Foundation, Fort Collins, Colo.

[22] Filed: Mar. 27, 1973

[21] Appl. No.: 345,274

[52] U.S. Cl. ................. 424/153; 424/156; 424/180
[51] Int. Cl.² ................... A61K 33/14; A61K 33/10; A61K 31/70
[58] Field of Search .................................... 424/153

[56] References Cited
OTHER PUBLICATIONS

Physicians' Desk Reference 25th Ed. (1971) pp. 900–902 and 1140.
Chemical Abstracts Vol. 75 Items 2934e and 2935f (1971) in Reference to Ann. N.Y. Acad. Sci. Publications.
Stephenson et al.— Vet. Drug Encyclopedia and Therapeutic Index (1964) pp. 57, 58 and 112.

Primary Examiner—Stanley J. Friedman
Attorney, Agent, or Firm—Edwin L. Spangler, Jr.

[57] ABSTRACT

This invention relates to a composition for the treatment of diarrhea in bovine animals which, in addition to the fluid and electrolyte losses sustained by the patient, contains up to as much as twelve times the concentration of potassium normally carried by the blood, glucose and a buffering agent capable of cooperating with the other ingredients to maintain a basic condition such that the pH does not exceed approximately ten, all in a solution that is either hypertonic or isotonic depending upon its method of administration. The solution can be administered intravenously in a concentrated hypertonic form or subcutaneously in a more dilute isotonic or, at most, slightly hypotonic form. The method of treatment varies with the condition of the patient, the critically ill one being given both the I.V. treatment with the solution of higher osmolarity and the subcutaneous treatment with the more dilute isotonic solution at the same time in preference to either one alone, whereas, the less critical patient can be treated with either one and, under most circumstances, just the isotonic solution administered subcutaneously.

17 Claims, No Drawings

METHOD AND COMPOSITION FOR TREATING DIARRHEA IN MAMMALS

While all mammals suffer from diarrhea, mammalian neonates are particularly susceptible to enteritis leading to severe diarrhea. The exact nature and cause of the diarrhea varies with the type of insult to the intestinal tract, the age of the animal and the species. Diarrhea can be caused by increased secretion as in human cholera or by decreased absorption, or both. Neonatal diarrhea may well be a combination of both processes when one takes into consideration the large variety of agents that can be responsible for bringing about the condition.

The disease is of tremendous economic and social significance all over the world. Some idea of its economic significance can be appreciated when one realizes that in the cattle industry alone, several million calves die annually of neonatal diarrhea and some experts consider it to be the second most important cattle disease for this reason. While its effects are also widely felt in the sheep and hog industries, the economic impact on the producer is not so great due to the lesser market value of the offspring. Conversely, its effect upon some of the mammals like dogs and horses that are raised for other than food is such that the more sophisticated and expensive treatments like those prescribed for humans is well within the realm of practicality.

In any event, while the disease can and does attack all mammals regardless of age or species, the immature digestive tract of the newborn mammal is especially vulnerable to improper feeding and to a wide variety of bacterial, viral and chlamydial agents capable of injuring same and causing diarrhea so that the neonate deserves special attention. Furthermore, the future trends in herd management such as confinement of the animals, controlled multiple ovulation and induced parturition promise to magnify an already serious problem.

Heretofore, the ideal treatment for diarrhea has been that of complete rest for the gastrointestinal system coupled with a slow intravenous replacement of body fluids. Obviously, therapy such as this is manifestly impractical to use in the treatment of animals in the field and even to treat many human patients located at a distance from proper medical facilities.

Another approach has been that of intensive treatment with antibacterial agents in an attempt to control what may be the cause of the disease while ignoring the damage that has already occurred as well as that which is currently taking place. Since the rear cause of death is seldom the infectious organism, but instead, the serious loss in body fluids and accompanying electrolyte and energy imbalances, antibacterial agents are often of no benefit whatsoever and may, in some instances, even be detrimental to the diarrheic patient.

It has now been found in accordance with the teaching of the instant invention that these and other shortcomings in the prior art methods and compositions for the treatment of calf diarrhea can, in large measure, be overcome by replacing the lost fluid and sodium chloride as has been done before but, in addition, administering a significant quantity of potassium in a highly buffered basic solution of selected tonicity that contains glucose. The critically ill calf has, as its most pressing needs, the replacement of the water lost and the correction of the acidosis condition, primarily the intracellular acidosis and secondarily, the vascular acidosis. These needs are taken care of in accordance with the teaching found herein by administering subcutaneously to the serious but not critically ill diarrheic bovine a highly buffered basic solution that is essentially isotonic and which contains much of the lost water and sodium chloride together with glucose and up to as much as 5.5 times the normal level of potassium found in the blood despite the fact that the $K^+$ concentration in the plasma under these conditions may already be nearly twice the normal level. If the patient is critically ill, the foregoing therapy is preferably supplemented by intravenous administration of a hypertonic form of the same solution or, alternatively, a slightly different solution of even higher pH made by adding hydroxyl ions thereto in the form of a strong base.

The solutions used are unique in that despite their highly basic constituency, they unexpectedly cause a substantial beneficial increase in intracellular pH including, on occasion a significant reduction in blood pH. Actually, the glucose performs an important, although not unexpected role in the therapy by reacting with the cellular component so as to prepare them to receive the potassium thus enhancing its movement into the cells to replace that which has been lost and correcting the hyperkalemic condition. Without the glucose, the concentrations of $K+$ contained in these solutions would likely be fatal. Glucose, of course, also serves as a source of much needed energy and returns the lowered blood glucose to more nearly its normal level.

It is, therefore, the principal object of the present invention to provide a novel and improved composition for treating diarrhea in bovine animals.

A second objective is the provision of a composition of the class described that becomes effective for both intravenous and subcutaneous administration when the tonicity thereof is adjusted through selective dilution between prescribed limits.

Another object is to provide a unique method for supplying supportive therapy with the same composition at different tonicities to both the seriously ill and critically ill bovine.

Still another object of the invention herein disclosed and claimed is to provide a buffered highly basic composition of selected osmolality capable of bringing about a dramatic increase in intracellular pH toward normal within a short period of time following the commencement of treatment.

An additional object is to provide a method for treating diarrheic bovines that is ideally suited for use under field conditions by non-professional persons who may even lack training or skill in even the very basic medical practices.

Further objects are to provide a composition for treating diarrhea in bovines that is safe, effective, simple to make up and administer, is economical and easy to store, has excellent shelf life, requires no refrigeration and causes no undesirable side effects.

Other objects will be in part apparent and in part pointed out specifically hereinafter as the detailed description of the invention proceeds.

To begin with, while the supportive therapy forming the subject matter of the instant invention has, thus far, only been applied to bovine neonates, there is no known reason why it would not be equally effective on mature animals of the bovine species as well as all other mammalins regardless of age including humans because their body chemistry is basically the same. The bovine neonates were chosen for the initial experimental work simply because of the tremendous economic impact the disease has had upon the cattle industry and the need for a solution is, therefore, important. Admittedly, certain practical difficulties exist with regard to treating certain mammals as outlined herein, for example, I.V. treatment of pigs, especially newborn ones is very difficult. Nevertheless, the supportive therapy should be equally effective in these other mammals despite problems such as that noted above.

In each instance of serious illness due to diarrhea, the main problems are those of: (1) acidosis (primarily intracellular although extracellular acidosis is also present), (2) hyperkalemia, (3) decrease in intracellular potassium concentration, (4) decrease in blood volume, and (5) lack of energy at the cells resulting from all five of the above. These are the factors of prime importance in therapy. As is the case with other supportive therapies known in the prior art, the instant one replaces the fluid losses by administering large quantities of water intravenously or subcutaneously or both depending upon the condition of the patient. While the fluid can, obviously, be replaced intraperitoneally with much the same results as when administered subcutaneously, intraperitoneal administration has the disadvantage not shared by the other two methods of requiring the patient's abdominal cavity be punctured and entered. As such, it is not nearly as safe a procedure, especially for the medically unskilled, as either I.V. or subcutaneous administration and it should, for this reason, be left to the veterinarian or physician. In the treatment of diarrheic animals, it is usually quite important from an economic standpoint that the supportive therapy be one that can be carried out in the field by the medically unskilled.

The quantity of water to be given varies with the size and condition of the patient. Obviously, while each liter bit of fluid tends to alleviate the dehydrated condition, eventually all the lost water must be restored to the system. In serious cases, failure to restore the lost water rapidly and in sufficient quantities to keep the blood volume above the critical level may cause the patient to expire before the supportive therapy can produce results. Conversely, it becomes almost a practical impossibility to give the patient too much fluid because the system will merely pass it out through the kidneys although as far as I.V. administration is concerned, the fluids can be administered too rapidly.

For the foregoing it can be seen that there are no well defined limits on fluid replacement, but instead, an attempt should be made to restore approximately that which the patient has lost. While keeping pace with the continuing losses, fortunately, no ill effects will be suffered if the estimate is incorrect and, even more fortunately, tests reveal that the clinical condition of the patient together with the body weight provides a reasonably close approximation of the total fluid loss suffered. Without going into detail at this time concerning the diagnostic procedure used to determine the clinical condition of the patient, it should suffice to point out that roughly 3.5 quarts of water for each 60 pounds of body weight will replace the fluid lost by a critically ill patient, whereas the serious ill but not critical one requires only about 2.5 quarts for the same amount of body weight.

Next, as in some other supportive therapies, the substantial sodium losses must be replaced. A number of diarrheic calves tested recently exhibited sodium losses ranging from a minimum of about 190 mg./kg./day up to as high as 290 mg./kg./day. This lost sodium must be replaced and, preferably, as the cation in the buffering agent, the most satisfactory one being sodium bicarbonate. Substantial chloride ion losses also occur and should be replaced as in the prior art supportive therapies; however, between 100 and 130 meq./L. of sodium is preferably included in the solution to only 30–100 meq./L. of chloride ion. This means, of course, that the bulk of the $Na^+$ should not come from other than sodium chloride. By including roughly 80 meq./L. of the bicarbonate ion in the form of sodium bicarbonate and the same amount of the chloride ion as sodium chloride, one falls within the upper limits of the 100–130 meq./L. preferred range of sodium ion concentration.

Since the preferred range of bicarbonate ion concentration is approximately 50–200 meq./L., considerably more than 80 meq./L. of $HCO_3^-$ in the form of sodium bicarbonate can be used. Additional buffering action, therefore, can be achieved with potassium bicarbonate where up to twelve times the normal plasma potassium concentration level of about 5 meq./L. has been employed successfully. Despite the fact that the plasma of the diarrheic patient already shows up to a two-fold increase in $K^+$ concentration, this hyperkalemic condition is unexpectedly alleviated by introducing even more potassium into the system. As was the case with the previously-mentioned ingredients, every little bit helps and there is, therefore, no minimum effective concentration although the preferred range is between approximately 15 and 60 meq./L.

The last, but certainly not the least important of the ingredients, is that of glucose. As previously mentioned, in addition to nurturing the weakened cells, it reacts with the cell components to enhance the movement into the cells of the excessive potassium ion already present in the blood as well as that which is being administered thus alleviating the hyperkalemic condition and replacing the potassium lost from the cells during diarrhea. The proper amount of glucose is approximately that which is required to supply the patient's metabolic energy needs. Somewhere between approximately 5%–8% glucose does quite nicely. If one were to define an upper limit of glucose concentration it would be something less than that required to exceed the desire osmolarity of the hypertonic I.V. solution and still leave room for the other necessary ingredients. Even with I.V. administration the glucose concentration necessary to stay below the osmolarity limits in the hypertonic solution are such as to fall well below that at which the renal threshold is exceeded and further dehyration might take place.

While on the subject of osmolarity, the I.V. solution is preferably hypertonic although it could be isotonic if it were not for certain practical considerations. An osmolarity of between approximately 500–1000 mosm./L. is the preferred range and good results have been achieved on a limited basis with a hypertonic solution having an osmolarity of 1000 mosm./L. brought about by the addition of hydroxyl ions to the already basic solution. In all probability, the osmolarity of the hypertonic solution for I.V. use might even be made higher without ill effect depending upon which of the ingredients had its relative concentration increased. For instance, as previously noted, the glucose concentration could probably be increased some more without ill effect. As a practical matter, however, the osmolality of the I.V. solution should be kept compatible with that of the more dilute subcutaneous solution which must be isotonic or nearly so. In other words, if the same mixture of dry ingredients is used for either I.V. use in a hypertonic form when dissolved in one quart of water for each sixty pounds of body weight or subcutaneous administration in isotonic form when diluted 2.5:1 compared with the I.V. solution, then the osmolarity of the hypertonic solution must, of necessity, be about 2.5 times that of the isotonic solution or $2.5 \times 285 = 712$ mosm./L. The key factor, obviously, is the isotonic solution which, by definition, must have an osmolality at or very close to the same as blood. If, therefore, the hypertonic solution has a high osmolality of up around 1000 or so, a proper subcutaneous solution will have to be made up by dissolving the dry ingredients in approximately 3.5 quarts of water for each 60 pounds of body weight instead of 2.5.

From the above explanation, it can be seen that there are many practical advantages to having a composition of the foregoing ingredients prepackaged in dry form such that when dissolved in one quantity of water they will cooperate therewith to produce the desired isotonic solution for subcutaneous administration and in a second lesser quantity of water to produce the more concentrated hypertonic solution for I.V. use. If we add to the above criteria, the other factor of desiring that the total quantity of water administered both intravenously and subcutaneously to the critically ill patient be approximately that which has been lost due to the diarrheic condition, we came up with something around 3-½ quarts for each 60 pounds of body weight. The seriously ill but not critically ill patient has suffered less of a fluid loss and needs to be given, therefore, only 2-½ quarts of fluid for each 60 pounds of body weight administered subcutaneously to the seriously ill patient should, and does, suffice quite nicely.

One such composition that satisifes the above conditions and has proven to be very effective in the treatment of neonatal diarrhea in cattle is as follows:

| Potassium | 23 meq./L. |
| Bicarbonate | 80 meq./L. |
| Sodium | 115 meq./L. |
| Chloride | 64 meq./L. |
| *Magnesium | 6.4 meq./L. |
| Glucose | 6.8% |

*A small quantity of mangnesium is helpful but is not essential and, for this reason, may be eliminated from the composition.

When the above mixture of dry ingredients is dissolved in 2.5 quarts of water, an essentially isotonic solution will result having an osmolality of around 285 mosm./L. which is ideally suited for subcutaneous administration to the seriously ill patient in dosages amounting to 2.5 quarts for each 60 pounds of body weight. In the case of the critically ill patient, the same ingredients dissolved in only one quart of water are administered intravenously for each 60 pounds of body weight. The resulting solution is hypertonic having an osmolality of about 712 and, as such it has the desirable effect of drawing fluid from the cells and returning it to the blood. In a severe diarrheic condition such as, for example, where the patient is unable to rise, the preferred supportive therapy is to administer the hypertonic and isotonic fluids in the recommended manner at the same time. The I.V. treatment takes care of the immediate emergency while the subcutaneous treatment provides longlasting relief up to about twelve hours. It is important in the treatment of animals in the field that they not have to be attended constantly or treated at frequent intervals.

The last of the significant criteria is the pH of the solution which is highly basic, that of the formulation set forth previously being in the order of 7.8. As far as a lower limit is concerned, the solution must not be acidic and any one with a pH above 7.0 will tend to alleviate the acidosis. As a pracitcal matter, a pH of around 7.6 or higher is preferred. As far as an upper limit is concerned, one critically ill calf in a comatose condition as a result of acute diarrhea was given an I.V. injection of the hypertonic solution of the present invention having a pH of 10.0 resulting from the addition of 13.5 ml. of 40% NaOH to the previously mentioned formulation with excellent results. Accordingly, a pH of 10.0 or perhaps a bit higher is well within the range of tolerability. It should be mentioned, however, that hypertonic solutions having pH's in the neighborhood of 10.0 and higher should only be administered by, or at least under the close supervision of, a medically trained person such as a veterinarian or physician.

The method of treatment varies with the condition of the patient while the dosage is a function of body weight. The critically ill patient is defined for present purposes as one that is unable to rise, is visibly dehydrated or in which the extremities are noticeably colder to the touch than the rest of the body. If death appears imminent and a medically trained person is in attendance, the emergency therapy with the high pH hypertonic solution to which the sodium hydroxide has been added is preferred, however, in the absence of the skilled practitioner, the regular hypertonic solution having a pH of about 7.9 or so should be administered. In either case, a liter of fluid for each sixty pounds of body weight should be administered slowly over about an hours time. In the case of animals, the fluid is preferably introduced directly into the jugular vein. The I.V. therapy should be repeated every eight hours or so until the patient can rise and the extremities are no longer cold to the touch. The high pH solution supplemented with the sodium hydroxide should only be administered once, however.

Satisfactory results can be obtained through use of the I.V. treatment alone in the case of the critically ill patient. For instance, one calf running a temperature of 103.6°F. was given the I.V. treatment without the subcutaneous treatment and a complete recovery from the effects of the diarrheic condition was observed within 24 hours. The solution used was the 7.8 pH hypertonic solution rather than the one supplemented with sodium hydroxide; however, the preferred treatment for the critically ill patient is both the I.V. and the subcutaneous therapy, especially under field conditions where the I.V. therapy alone becomes impractical. The I.V. treatment should be discontinued when the patient's extremities have warmed to approximately the same temperature as the rest of the body. The subcutaneous treatment is continued on beyond that until the patient experiences a full recovery as evidenced by the fact that no more diarrheic feces is being passed.

In the case of the seriously ill but not critical patient, only the subcutaneous therapy is used. This condition is defined for present purposes as that in which the patient is able to rise unassisted and the extremities are about the same temperature as the rest of the body. Here, 2.5 quarts of the isotonic solution are administered subcutaneously for each 60 pounds of body weight every 8–12 hours until the patient recovers as indicated above.

By way of specific example of the effectiveness of the instant invention, one calf suffering from severe neonatal diarrhea was comatose and near death. His body temperature at the onset of treatment was only 95.5°F. which is 6° below normal. In the case history under discussion, the plasma protein concentration was up to 8.1 grams/100 ml. at the onset of combined I.V. and subcutaneous treatment with the solutions and in accordance with the method previously outlined. Immediately following treatment, the calf's plasma protein dropped back down to a level of 7.3, however, four hours later it had again risen to the extremely high level of 8.7; whereupon a second I.V. treatment was given. An immediate favorable response was noted and his plasma protein dropped to 6.4 and remained down.

Another calf from the same herd was given an identical initial treatment which resulted in an immediate lowering of his plasma protein concentration from 6.4 down to 5.7 g./100 ml. where it remained essentially steady. A less critically ill calf from the herd was given only the subcutaneous treatment with a resultant drop in plasma protein concentration down to a steady level of about 5.8 g./100 ml. from a high of about 6.3 g./100 ml. at the onset of treatment some four hours earlier. All in all, some fourteen calves suffering from acute diarrhea were treated in a herd that had experienced a considerable death loss. All of the calves treated were saved.

By way of evaluating the effectiveness of the instant combination I.V. and subcutaneous therapy with the hypertonic solution having an osmolality of approximately 712 mosm./L. and the isotonic solution, the patient's subcutaneous temperature, hematocrit and plasma protein concentration, potassium ion concentration (both plasma and intracellular), and intra- and extracellular pH give evidence of the patient's clinical condition.

As far as temperature is concerned, a drop in subcutaneous temperature is indicative of a decrease in blood volume because one of the animal's first responses to hypovelemia is peripheral vasoconstriction. As vasoconstriction occurs, the surface and subcutaneous temperatures begin to approach ambient temperature.

Changes in the hematocrit and plasma protein concentration are directly related to changes in blood volume as both are constituents of the blood that are not lost during diarrhea. Therefore, as blood volume decreases, hematocrit and plasma proteins increase. The converse is also true.

Potassium ($K^+$) is normally in very low concentration in the blood and high intracellularly. With diarrhea the plasma $K^+$ concentration is increased because of loss from the cells, and $K^+$ is also lost from the body. If therapy is effective, $K^+$ will move from the blood into the cells following treatment.

With regard to pH, both the intracellular and blood pH are effected with acidosis developing in each. The following tables show the effects of the combination I.V. and subcutaneous therapy on several diarrheic calves with respect to the four previously mentioned criteria.

TABLE 1

Mean Changes in Subcutaneous Temperature (°F.) With Therapy

| | Hock | Fetlock |
|---|---|---|
| Normal | 99.7 | 97.6 |
| Severe diarrhea | 92.4 | 87.3 |
| Temperature rise with intravenous treatment | 5.1 | 3.5 |
| Temperature rise with subcutaneous therapy (4 hours after treatment) | 1.3 | 3.4 |

TABLE 2

Mean Changes In Hematocrit and Plasma Protein Concentration With Therapy

| | Hematocrit | Plasma Protein |
|---|---|---|
| Normal | 35.7 | 5.92 g./100 ml. |
| Diarrhea | 51.2 | 7.85 |
| Intravenous treatment | −10.5 | −2.3 |
| Subcutaneous treatment (4 hours after treatment) | +1 | +0.05 |

*With subcutaneous therapy the values were taken at 4 hours after treatment. The lack of change indicates stabilization of the patient. The slow absorption of the treatment fluid probably just matches the intestinal loss.

TABLE 3

Mean Changes in Plasma and Intracellular Potassium Concentration With Therapy

| | Plasma $K^+$ meq./liter | Intracellular $K^+$ (muscle) |
|---|---|---|
| Normal | 4.62 | 167 |
| Diarrhea | 8.06 | 147 |
| Intravenous treatment | −1.52 | +7 |
| Subcutaneous treatment (4 hours after treatment) | −0.5* | — |

*Subcutaneous therapy effect based on one determination.

TABLE 4

Mean Changes in pH During Therapy

| | Plasma | Intracellular (muscle) |
|---|---|---|
| Normal | 7.441 | 7.011 |
| Diarrhea | 7.042 | 6.784 |
| Intravenous treatment | 7.111 | 6.878 |
| Subcutaneous* | 7.142* | — |

*Subcutaneous therapy effect based on one determination.

In still another case, a calf was given the I.V. treatment with a hypertonic solution having a pH of 10.35 and which contained the ingredients shown in Table 5 to which the sodium hydroxide has been added. When the treatment with this solution began the calf was comatose, acidotic and hypothermic. It was sitting up by itself 45 minutes after initiation of therapy and continued to improve. A temperature increase occurred coincident with or shortly after the onset of shivering and some 50 minutes after the start of therapy. The shivering is indicative of increased muscle metabolism. Table 7 shows the calf's response to this therapy.

TABLE 5

High level therapy ingredients per liter:

| | | |
|---|---|---|
| $Na^+$ | 215 meq. | (NaOh, $NaHCO_3$) |
| $K^+$ | 61 meq. | (KOH) |
| $HCO_3-$ | 200 meq. | ($NaHCO_3$) |
| Glucose | 8% w/v | (Dextrose) |
| $Cl^-$ | 20 meq. | ($MgCl_2$) |
| $Mg^{++}$ | 10 meq. | ($MgCl_2$) |
| Osmolarity | 1000 mosm. | |
| pH | 10.35 | |

TABLE 6

| Values during and after therapy: T = time in minutes/Liter adminstered | | | | | |
|---|---|---|---|---|---|
| | | HCT | K+ | pH | Glucose | Temp (rectal) |
| '0 | | 49.5 | 5.8 | 7.128 | 18 mg./100 ml. | 92° |
| '25 | (500cc) | 36 | 5.3 | 7.325 | 265 | 92.5° |
| '45 | (800cc) | 31.5 | 5.2 | 7.380 | 324 | — |
| '60 | (all in) | 31.5 | — | 7.400 | 491 | 94.5° |
| '95 | | 37.0 | 5.7 | 7.350 | 262 | 94.5° |
| '135 | | 41.0 | 3.7 | 7.345 | 116 | 95.5° |
| '175 | | 42.0 | 4.0 | 7.360 | 87 | 96.5° |
| '270 | | 44.0 | 5.0 | — | 96 | 97.2° |

The changes in hematocrit and plasma protein concentration are directly related to the changes in blood volume occasioned by a diarrheic condition because these blood constituents are not lost during diarrhea. Therefore, when the blood volume decreases due to fluid loss, it is evidenced by an increase in hematocrit and plasma proteins. The converse is also true so that monitoring one or both of these blood constituents provides a good indication of the condition of the patient and the effectiveness of the treatment.

What is claimed is:

1. A parenteral composition for use as supportive therapy in a treatment for diarrhea in bovine animals that includes the replacement of lost sodium and chloride ions comprising: a buffered basic aqueous solution that is either isotonic or hypertonic with respect to normal blood, between approximately three and twelve times the potassium ion concentration present in normal blood, said blood normally having a potassium ion concentration of about 5 meq./L., and an amount of glucose effective as a source of energy and effective to enhance the movement of potassium into the cells thereby replacing lost potassium.

2. The composition as set forth in claim 1 in which: the pH is not appreciably less than 7.6 nor substantially greater than 10.

3. The composition as set forth in claim 1 in which: the potassium concentration is between approximately 15 and 60 meq./L.

4. The composition as set forth in claim 1 in which: the solution is hypertonic and has an osmolality of between approximately 500 and 1000 mosm./L.

5. The composition as set forth in claim 1 in which: the solution is hypertonic and includes sufficient sodium hydroxide to bring the pH up to about 10.0.

6. The composition as set forth in claim 5 in which: the solution contains the equivalent of approximately 5.4 gms./L. of sodium hydroxide and has an osmolality of approximately 1000 mosm./L.

7. The composition as set forth in claim 1 in which: the solution is buffered with the bicarbonate ion at a concentration of between approximately 50–200 meq./L.

8. The composition as set forth in claim 7 in which: the buffering agent is sodium bicarbonate.

9. The composition as set forth in claim 1 in which: the hypertonic solution contains between approximately 5% and 8% glucose.

10. The dry composition for use dissolved in water to form a parenteral solution to be administered as supportive therapy in the treatment of diarrhea in bovine animals which comprises: approximately 1.7 grams of potassium chloride, 2.0 grams of sodium chloride, 6.8 grams of sodium bicarbonate and 68 grams of glucose.

11. The dry composition of claim 10 dissolved in enough water to produce an isotonic solution.

12. The dry composition of claim 10 dissolved in enough water to produce a hypertonic solution having an osmolality greater than 500 mosm./L.

13. The dry composition as set forth in claim 12 in which the hypertonic solution has an osmolality of approximately 712 mosm./L.

14. The dry composition as set forth in claim 10 which includes approximately 1.3 grams of $MgCl_2 \cdot 6H_2O$.

15. The method of treating diarrhea in bovine animals which comprises: slowly administering intravenously to a critically ill animal approximately one quart for each sixty pounds of body weight of a buffered basic aqueous solution which is hypertonic with respect to normal blood and which contains sodium and chloride ions at a concentration effective to replace those lost due to dehydration, potassium ions at a concentration amounting to approximately from three to twelve times the potassium concentration in normal bovine blood, said blood normally having a potassium ion concentration of about 5 meq./L., and an amount of glucose effective as a source of energy and effective to enhance the movement of potassium into the cells thereby replacing lost potassium.

16. The method of treating diarrhea as set forth in claim 15 which includes also administering subcutaneously approximately 2-½ quarts for each 60 pounds of body weight the hypertonic solution diluted to the point at which it becomes isotonic.

17. The method of treating diarrhea in bovine animals which comprises: administering subcutaneously to a seriously ill animal approximately 2-½ quarts for each 60 pounds of body weight of a buffered basic aqueous solution which is isotonic with respect to normal blood and which contains sodium and chloride ions at a concentration effective to substantially replace those lost due to dehydration, potassium ions at a concentration amounting to not less than that which is effective to improve the hyperkalemic condition and on up to five times the potassium concentration in normal bovine blood, said blood normally having a potassium ion concentration of about 5 meq./L., and an amount of glucose effective as a source of energy and effective to enhance the movement of potassium into the cells thereby replacing lost potassium.

* * * * *